(12) United States Patent
Gabriel et al.

(10) Patent No.: US 12,214,548 B2
(45) Date of Patent: Feb. 4, 2025

(54) PROCESSES FOR PRODUCING A SHAPED BODY USING POLYAMIDE BLENDS CONTAINING A POLYARYLETHER

(71) Applicant: BASF SE, Ludwigshafen am Rhein (DE)

(72) Inventors: Claus Gabriel, Ludwigshafen am Rhein (DE); Martin Weber, Ludwigshafen am Rhein (DE); Philipp Kloke, Schramberg (DE); Thomas Meier, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 1554 days.

(21) Appl. No.: 16/321,079

(22) PCT Filed: Jul. 21, 2017

(86) PCT No.: PCT/EP2017/068534
§ 371 (c)(1),
(2) Date: Jan. 28, 2019

(87) PCT Pub. No.: WO2018/019730
PCT Pub. Date: Feb. 1, 2018

(65) Prior Publication Data
US 2019/0168450 A1    Jun. 6, 2019

(30) Foreign Application Priority Data
Jul. 29, 2016 (EP) .................................... 16181973

(51) Int. Cl.
*B29C 64/153* (2017.01)
*B29K 71/00* (2006.01)
(Continued)

(52) U.S. Cl.
CPC ............ *B29C 64/153* (2017.08); *B33Y 10/00* (2014.12); *B33Y 70/00* (2014.12); *B33Y 80/00* (2014.12);
(Continued)

(58) Field of Classification Search
None
See application file for complete search history.

(56) References Cited

U.S. PATENT DOCUMENTS 3,997,385 A * 12/1976 Osborne ............. B29C 65/1445
                                                                156/497
6,136,948 A    10/2000 Dickens, Jr. et al.
(Continued)

FOREIGN PATENT DOCUMENTS

CA    3012792 A1    8/2017
CA    3012952 A1    8/2017
(Continued)

OTHER PUBLICATIONS

CN 105163928 translation (Year: 2022).*
(Continued)

*Primary Examiner* — Jeffrey M Wollschlager
*Assistant Examiner* — Guy F Mongelli
(74) *Attorney, Agent, or Firm* — Faegre Drinker Biddle & Reath LLP

(57) ABSTRACT

The present invention relates to a process for producing a shaped body by selective laser sintering of a sinter powder (SP). The sinter powder (SP) comprises at least one semicrystalline polyamide, at least one nylon-6I/6T and at least one polyaryl ether. The present invention further relates to a shaped body obtainable by the process of the invention and to the use of a polyaryl ether in a sinter powder (SP) for broadening the sintering window ($W_{SP}$) of the sinter powder (SP).

10 Claims, 1 Drawing Sheet

(51) Int. Cl.
  *B29K 77/00* (2006.01)
  *B29K 81/00* (2006.01)
  *B33Y 10/00* (2015.01)
  *B33Y 70/00* (2020.01)
  *B33Y 80/00* (2015.01)
  *C08L 71/12* (2006.01)
  *C08L 77/02* (2006.01)
  *C08L 81/06* (2006.01)

(52) U.S. Cl.
  CPC .............. *C08L 71/12* (2013.01); *C08L 77/02* (2013.01); *B29K 2071/00* (2013.01); *B29K 2077/00* (2013.01); *B29K 2081/06* (2013.01); *C08L 81/06* (2013.01)

(56) References Cited

U.S. PATENT DOCUMENTS

| | | | |
|---|---|---|---|
| 6,551,546 B1 | 4/2003 | Grosch et al. | |
| 7,211,615 B2 | 5/2007 | Baumann et al. | |
| 7,825,204 B2 | 11/2010 | Kaminsky et al. | |
| 2003/0094734 A1* | 5/2003 | Deckard | B29C 70/54 204/488 |
| 2004/0135292 A1* | 7/2004 | Coats | G03F 7/0037 264/401 |
| 2005/0051926 A1* | 3/2005 | Guillot | B29C 41/04 528/310 |
| 2007/0154668 A1* | 7/2007 | Rhee | C08J 5/18 525/432 |
| 2008/0300353 A1* | 12/2008 | Monsheimer | C08L 77/00 524/394 |
| 2011/0213098 A1* | 9/2011 | La Camera | C08L 77/00 525/426 |
| 2013/0177766 A1* | 7/2013 | Grebe | B29C 64/153 264/460 |
| 2013/0216836 A1* | 8/2013 | Grebe | B29C 64/153 425/150 |
| 2013/0331500 A1* | 12/2013 | Yokoe | C08J 5/042 524/502 |
| 2014/0141166 A1* | 5/2014 | Rodgers | C08L 77/06 427/256 |
| 2015/0259530 A1* | 9/2015 | Rodgers | B33Y 70/00 525/437 |
| 2015/0336292 A1* | 11/2015 | Mikulak | D01D 5/34 428/402 |
| 2016/0250624 A1 | 9/2016 | Parvulescu et al. | |
| 2017/0054191 A1* | 2/2017 | Williams | B29C 64/106 |
| 2017/0198104 A1* | 7/2017 | Bheda | B29C 48/022 |
| 2017/0239627 A1 | 8/2017 | Weber et al. | |
| 2017/0267948 A1 | 9/2017 | Kniesel et al. | |
| 2017/0333849 A1 | 11/2017 | Weber et al. | |
| 2018/0009982 A1* | 1/2018 | Steele | C08G 69/265 |
| 2018/0072868 A1 | 3/2018 | Richter et al. | |
| 2018/0118934 A1 | 5/2018 | Weber et al. | |
| 2018/0126338 A1 | 5/2018 | Weber et al. | |
| 2018/0201758 A1 | 7/2018 | Richter et al. | |
| 2018/0208880 A1 | 7/2018 | Kniesel et al. | |
| 2018/0257044 A1 | 9/2018 | Gronwald et al. | |
| 2018/0272286 A1 | 9/2018 | Gronwald et al. | |

FOREIGN PATENT DOCUMENTS

| | | | | |
|---|---|---|---|---|
| CA | 3014262 A1 | 8/2017 | | |
| CA | 3032194 A1 | 2/2018 | | |
| CA | 3032199 A1 | 2/2018 | | |
| CA | 3032219 A1 | 2/2018 | | |
| CN | 103053227 A | * | 4/2013 | ......... C23C 18/1608 |
| CN | 104140668 A | | 11/2014 | |
| CN | 104231607 A | | 12/2014 | |
| CN | 105163928 A | * | 12/2015 | .......... B29C 64/106 |
| DE | 19859561 A1 | | 6/2000 | |
| EP | 1267169 A2 | * | 12/2002 | .......... B01L 3/5085 |
| EP | 1443073 A1 | | 8/2004 | |
| JP | 07150027 A | * | 6/1995 | |
| JP | H07150027 | * | 6/1995 | |
| JP | 2003-119375 A | | 4/2003 | |
| JP | 2010-006057 A | | 1/2010 | |
| JP | 2016-505409 A | | 2/2016 | |
| JP | 2017-530218 A | | 10/2017 | |
| WO | WO-8705853 A | * | 10/1987 | ............. B29B 17/00 |
| WO | WO-9606881 A2 | | 3/1996 | |
| WO | WO-2008057844 A1 | | 5/2008 | |
| WO | WO-2009114715 A2 | | 9/2009 | |
| WO | WO-2011124278 A1 | | 10/2011 | |
| WO | WO-2012041793 A1 | | 4/2012 | |
| WO | 2015/081009 A1 | | 6/2015 | |
| WO | WO-2016023765 A1 | | 2/2016 | |
| WO | WO-2016066661 A1 | | 5/2016 | |
| WO | WO-2016087351 A1 | | 6/2016 | |
| WO | WO-2016112283 A1 | | 7/2016 | |
| WO | WO-2016166140 A1 | | 10/2016 | |
| WO | WO-2016166166 A1 | | 10/2016 | |
| WO | WO-2016184945 A1 | | 11/2016 | |
| WO | WO-2017009357 A1 | | 1/2017 | |
| WO | WO-2017017176 A1 | | 2/2017 | |
| WO | WO-2017045983 A1 | | 3/2017 | |
| WO | WO-2017045985 A1 | | 3/2017 | |
| WO | WO-2017140764 A1 | | 8/2017 | |
| WO | WO-2017140779 A1 | | 8/2017 | |
| WO | WO-2017140795 A1 | | 8/2017 | |
| WO | WO-2017148850 A1 | | 9/2017 | |
| WO | WO-2017216022 A1 | | 12/2017 | |
| WO | WO-2017216023 A1 | | 12/2017 | |
| WO | WO-2017220363 A1 | | 12/2017 | |
| WO | WO-2017220386 A1 | | 12/2017 | |
| WO | WO-2018019727 A1 | | 2/2018 | |
| WO | WO-2018019728 A1 | | 2/2018 | |
| WO | WO-2018019730 A1 | | 2/2018 | |

OTHER PUBLICATIONS

JP H07150027 translation (Year: 2023).*
International Search Report for PCT/EP2017/068526 mailed Oct. 11, 2017.
International Search Report for PCT/EP2017/068529 mailed Oct. 13, 2017.
International Search Report for PCT/EP2017/068534 mailed Oct. 13, 2017.
Written Opinion of the International Searching Authority for PCT/EP2017/068526 mailed Oct. 11, 2017.
Written Opinion of the International Searching Authority for PCT/EP2017/068529 mailed Oct. 13, 2017.
Written Opinion of the International Searching Authority for PCT/EP2017/068534 mailed Oct. 13, 2017.
U.S. Appl. No. 16/321,086, filed Jan. 28, 2019, BASF SE.
U.S. Appl. No. 16/321,089, filed Jan. 28, 2019, BASF SE.
Goodridge, R., et al., "Processing of a Polyamide-12/carbon nanofibre composite by laser sintering", Polymer Testing, 2011, vol. 30, pp. 94-100.
Verbelen, L., et al., "Characterization of polyamide powders for determination of laser sintering processability", European Polymer Journal, vol. 75, pp. 163-174.
Yan, C., et al., "Preparation, characterisation and processing of carbon fibre/polyamide-12 composites for selective laser sintering", Composites Science and Technology, 2011, vol. 71, pp. 1834-1841.
Yang, J., et al., "Selective laser sintering of polyamide 12/potassium titanium whisker composites", Journal of Applied Polymer Science, 2010, vol. 117, pp. 2196-2204.

* cited by examiner

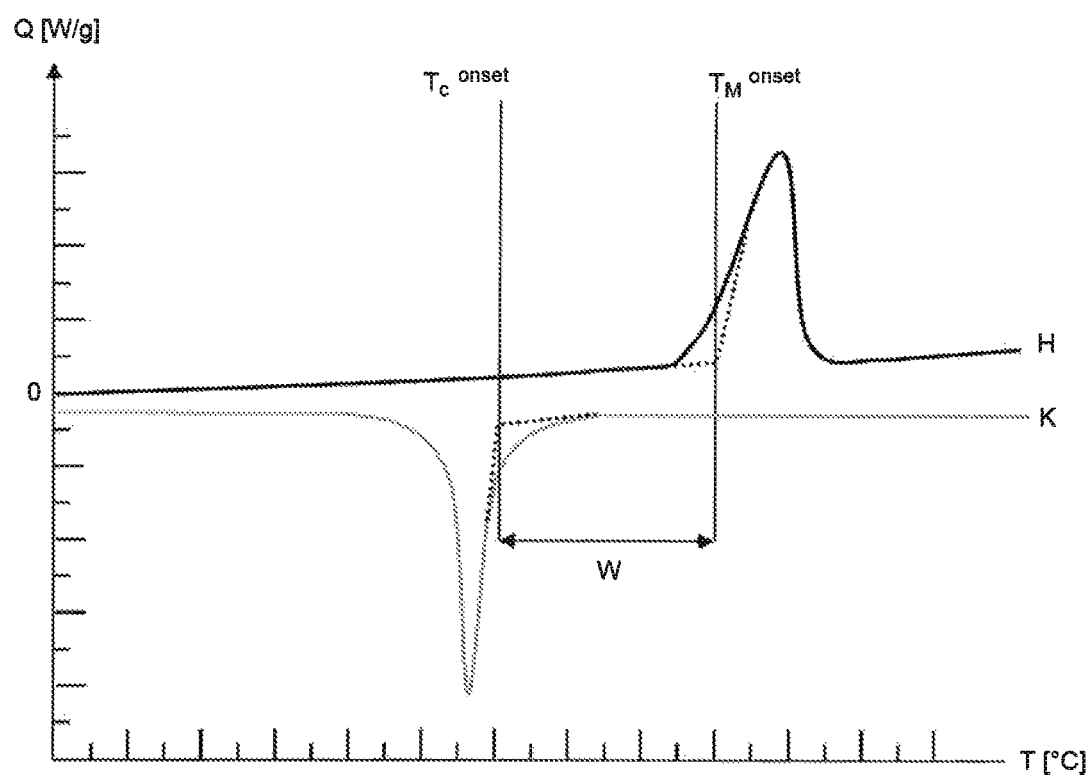

PROCESSES FOR PRODUCING A SHAPED BODY USING POLYAMIDE BLENDS CONTAINING A POLYARYLETHER

CROSS-REFERENCE TO RELATED APPLICATIONS

This application is a national stage application (under 35 U.S.C. § 371) of PCT/EP2017/068534, filed Jul. 21, 2017, which claims benefit of European Application No. 16181973.5, filed Jul. 29, 2016, both of which are incorporated herein by reference in their entirety.

The present invention relates to a process for producing a shaped body by selective laser sintering of a sinter powder (SP). The sinter powder (SP) comprises at least one semicrystalline polyamide, at least one nylon-6I/6T and at least one polyaryl ether. The present invention further relates to a shaped body obtainable by the process of the invention and to the use of a polyaryl ether in a sinter powder (SP) for broadening the sintering window ($W_{SP}$) of the sinter powder (SP).

The rapid provision of prototypes is a problem which has frequently occurred in recent times. One process which is particularly suitable for this so-called "rapid prototyping" is selective laser sintering (SLS). This involves selectively exposing a polymer powder in a chamber to a laser beam. The powder melts, and the molten particles coalesce and solidify again. Repeated application of polymer powder and the subsequent exposure to a laser facilitates modeling of three-dimensional shaped bodies.

The process of selective laser sintering for production of shaped bodies from pulverulent polymers is described in detail in patent specifications U.S. Pat. No. 6,136,948 and WO 96/06881.

A factor of particular significance in selective laser sintering is the sintering window of the sinter powder. This should be as broad as possible in order to reduce warpage of components in the laser sintering operation. Moreover, the recyclability of the sinter powder is of particular significance. The prior art describes various sinter powders for use in selective laser sintering.

WO 2009/114715 describes a sinter powder for selective laser sintering that comprises at least 20% by weight of polyamide polymer. This polyamide powder comprises a branched polyamide, the branched polyamide having been prepared proceeding from a polycarboxylic acid having three or more carboxylic acid groups.

WO 2011/124278 describes sinter powders comprising coprecipitates of PA 11 with PA 1010, of PA 11 with PA 1012, of PA 12 with PA 1012, of PA 12 with PA 1212 or of PA 12 with PA 1013.

EP 1 443 073 describes sinter powders for a selective laser sintering method. These sinter powders comprise a nylon-12, nylon-11, nylon-6,10, nylon-6,12, nylon-10,12, nylon-6 or nylon-6,6, and a free flow aid.

US 2015/0259530 describes a semicrystalline polymer and a secondary material which can be used in a sinter powder for selective laser sintering. Preference is given to using polyether ether ketone or polyether ketone ketone as semicrystalline polymer, and polyetherimide as secondary material.

US 2014/0141166 describes a polyamide blend which can be used as filament in a 3D printing process. This polyamide blend comprises, as semicrystalline polyamide, for example, nylon-6, nylon-6,6, nylon-6,9, nylon-6,10, nylon-7, nylon-11, nylon-12 or mixtures thereof and, as amorphous polyamide, preferably nylon-6/3T, where in the range from 30% to 70% by weight of the amorphous polyamide is present in the polyamide blend.

A disadvantage of the sinter powders described in the prior art for production of shaped bodies by selective laser sintering is that the sintering window of the sinter powder is frequently reduced in size compared to the sintering window of the pure polyamide or of the pure semicrystalline polymer. A reduction in the size of the sintering window is disadvantageous, since this results in frequent warpage of the shaped bodies during production by selective laser sintering. This warpage virtually rules out use or further processing of the shaped bodies. Even during the production of the shaped bodies, the warpage can be so severe that further layer application is impossible and therefore the production process has to be stopped.

It is thus an object of the present invention to provide a process for producing shaped bodies by selective laser sintering, which has the aforementioned disadvantages of the processes described in the prior art only to a lesser degree, if at all. The process shall be very simple and inexpensive to perform.

This object is achieved by a process for producing a shaped body by selective laser sintering of a sinter powder (SP), wherein the sinter powder (SP) comprises the following components:

(A) at least one semicrystalline polyamide comprising at least one unit selected from the group consisting of —NH—$(CH_2)_m$—NH— units where m is 4, 5, 6, 7 or 8, —CO—$(CH_2)_n$—NH— units where n is 3, 4, 5, 6 or 7, and —CO—$(CH_2)_o$—CO— units where o is 2, 3, 4, 5 or 6, (B) at least one nylon-6I/6T, (C) at least one polyaryl ether, wherein component (C) is a polyaryl ether containing units of the general formula (I)

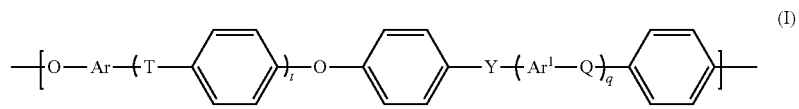

with the following definitions;

t, q: each independently 0, 1, 2 or 3,

Q, T, Y: each independently a chemical bond or group selected from —O—, —S—, —$SO_2$—, S=O, C=O, —N=N— and —$CR^aR^b$— where $R^a$ and $R^b$ are each independently a hydrogen atom or a $C_1$-$C_{12}$-alkyl, $C_1$-$C_{12}$-alkoxy or $C_6$-$C_{18}$-aryl group and where at least one of Q, T and Y is —$SO_2$— and Ar, $Ar^1$: each independently an arylene group having from 6 to 18 carbon atoms.

The present invention also provides a process for producing a shaped body by selective laser sintering of a sinter powder (SP), wherein the sinter powder (SP) comprises the following components:

(A) at least one semicrystalline polyamide comprising at least one unit selected from the group consisting of —NH—$(CH_2)_m$—NH— units where m is 4, 5, 6, 7 or 8, —CO—$(CH_2)_n$—NH— units where n is 3, 4, 5, 6 or 7, and —CO—$(CH_2)_o$—CO— units where o is 2, 3, 4, 5 or 6, (B) at least one nylon-6I/6T, (C) at least one polyaryl ether, It has been found that, surprisingly, the sinter powder (SP) used in the process of the invention has such a broadened sintering window ($W_{SP}$) that the shaped body produced by selective laser sintering of the sinter powder (SP) has distinctly reduced warpage, if any. Moreover, the shaped body produced in accordance with the invention has elevated elongation at break. In addition, the recyclability of the sinter powder (SP) used in the process of the invention is high even after thermal aging. This means that sinter powder (SP) not melted in the production of the shaped body can be reused. Even after several laser sinter cycles, the sinter powder (SP) has similarly advantageous sintering properties to those in the first sintering cycle.

The shaped bodies obtained by selective laser sintering of the sinter powder (SP) of the invention additionally exhibit lower water absorption after storage at 70° C. for 336 hours at 62% relative humidity compared to shaped bodies produced by selective laser sintering of a mixture of components (A) and (B). As a result, the mechanical properties of the shaped bodies produced in accordance with the invention, especially in the conditioned state, are also improved over those of shaped bodies in the conditioned state that have been produced from a mixture of components (A) and (B) only.

The sinter powder (SP) used in accordance with the invention additionally has higher glass transition temperatures than a mixture of components (A) and (B).

A BRIEF DESCRIPTION OF THE FIGURE

FIG. 1 illustrates a DSC diagram comprising a heating run (H) and a cooling run (C).

The process according to the invention is more particularly elucidated hereinbelow.

Selective Laser Sintering

The process of selective laser sintering is known per se to the person skilled in the art, for example from U.S. Pat. No. 6,136,948 and WO 96106881.

In laser sintering a first layer of a sinterable powder is arranged in a powder bed and briefly locally exposed to a laser beam. Only the portion of the sinterable powder exposed to the laser beam is selectively melted (selective laser sintering). The molten sinterable powder coalesces and thus forms a homogeneous melt in the exposed region. The region subsequently cools down again and the homogeneous melt resolidifies. The powder bed is then lowered by the layer thickness of the first layer, and a second layer of the sinterable powder is applied and selectively exposed and melted with the laser. This firstly joins the upper second layer of the sinterable powder with the lower first layer; the particles of the sinterable powder within the second layer are also joined to one another by the melting. By repeating the lowering of the powder bed, the application of the sinterable powder and the melting of the sinterable powder, it is possible to produce three-dimensional shaped bodies. The selective exposure of certain locations to the laser beam makes it possible to produce shaped bodies also having cavities for example. No additional support material is necessary since the unmolten sinterable powder itself acts as a support material.

All powders known to those skilled in the art and meltable by exposure to a laser are suitable as sinterable powder in the selective laser sintering. According to the invention, the sinterable powder used in the selective laser sintering is the sinter powder (SP).

In the context of the present invention, therefore, the terms "sinterable powder" and "sinter powder (SP)" can be used synonymously; in that case, they have the same meaning.

Suitable lasers for selective laser sintering are known to those skilled in the art and include for example fiber lasers, Nd:YAG lasers (neodymium-doped yttrium aluminum garnet laser) and carbon dioxide lasers.

Of particular importance in the selective laser sintering process is the melting range of the sinterable powder, called the "sintering window (W)". When the sinterable powder is the sinter powder (SP) of the invention, the sintering window (W) is referred to in the context of the present invention as "sintering window ($W_{SP}$)" of the sinter powder (SP). If the sinterable powder is a mixture of components (A) and (B) present in the sinter powder (SP), the sintering window (W) is referred to in the context of the present invention as "sintering window ($W_{AB}$)" of the mixture of components (A) and (B).

The sintering window (W) of a sinterable powder can be determined, for example, by differential scanning calorimetry, DSC.

In differential scanning calorimetry, the temperature of a sample, i.e. in the present case a sample of the sinterable powder, and the temperature of a reference are altered in a linear manner with time. For this purpose, heat is supplied to/removed from the sample and the reference. The amount of heat Q necessary to keep the sample at the same temperature as the reference is determined. The amount of heat $Q_R$ supplied to/removed from the reference serves as a reference value.

If the sample undergoes an endothermic phase transformation, an additional amount of heat Q has to be supplied to keep the sample at the same temperature as the reference. If an exothermic phase transformation takes place, an amount of heat Q has to be removed to keep the sample at the same temperature as the reference. The measurement affords a DSC diagram in which the amount of heat Q supplied to/removed from the sample is plotted as a function of temperature T.

Measurement typically involves initially performing a heating run (H), i.e. the sample and the reference are heated in a linear manner. During the melting of the sample (solid/liquid phase transformation), an additional amount of heat Q has to be supplied to keep the sample at the same temperature as the reference. A peak is then observed in the DSC diagram, called the melting peak.

After the heating run (H), a cooling run (C) is typically measured. This involves cooling the sample and the reference in a linear manner, i.e. heat is removed from the sample and the reference. During the crystallization/solidification of the sample (liquid/solid phase transformation), a greater amount of heat Q has to be removed to keep the sample at the same temperature as the reference, since heat is liberated in the course of crystallization/solidification. In the DSC diagram of the cooling run (C), a peak, called the crystallization peak, is then observed in the opposite direction from the melting peak.

In the context of the present invention, the heating during the heating run is typically effected at a heating rate of 20 K/min. The cooling during the cooling run in the context of the present invention is typically effected at a cooling rate of 20 K/min.

A DSC diagram comprising a heating run (H) and a cooling run (C) is depicted by way of example in FIG. 1. The DSC diagram can be used to determine the onset temperature of melting ($T_M^{onset}$) and the onset temperature of crystallization ($T_C^{onset}$).

To determine the onset temperature of melting ($T_M^{onset}$), a tangent is drawn against the baseline of the heating run (H) at the temperatures below the melting peak. A second tangent is drawn against the first point of inflection of the melting peak at temperatures below the temperature at the maximum of the melting peak. The two tangents are extrapolated until they intersect. The vertical extrapolation of the intersection to the temperature axis denotes the onset temperature of melting ($T_M^{onset}$).

To determine the onset temperature of crystallization ($T_C^{onset}$) a tangent is drawn against the baseline of the cooling run (C) at the temperatures above the crystallization peak. A second tangent is drawn against the point of inflection of the crystallization peak at temperatures above the temperature at the minimum of the crystallization peak. The two tangents are extrapolated until they intersect. The vertical extrapolation of the intersection to the temperature axis denotes the onset temperature of crystallization ($T_C^{onset}$).

The sintering window (W) is the difference between the onset temperature of melting ($T_M^{onset}$) and the onset temperature of crystallization ($T_C^{onset}$). Thus:

$$W = T_M^{onset} - T_C^{onset}.$$

In the context of the present invention, the terms "sintering window (W)", "size of the sintering window (W)" and "difference between the onset temperature of melting ($T_M^{onset}$) and the onset temperature of crystallization ($T_C^{onset}$)" have the same meaning and are used synonymously.

The determination of the sintering window ($W_{SP}$) of the sinter powder (SP) and the determination of the sintering window ($W_{AB}$) of the mixture of components (A) and (B) are effected as described above. The sample used to determine the sintering window ($W_{SP}$) of the sinter powder (SP) is then the sinter powder (SP). The sintering window ($W_{AB}$) of the mixture of components (A) and (B) is determined using a mixture (blend) of components (A) and (B) present in the sinter powder (SP) as sample.

Sinter Powder (SP)

According to the invention, the sinter powder (SP) comprises at least one semicrystalline polyamide as component (A), at least one nylon-6I/6T as component (B), and at least one polyaryl ether as component (C).

In the context of the present invention the terms "component (A)" and "at least one semicrystalline polyamide" are used synonymously and therefore have the same meaning.

The same applies to the terms "component (B)" and "at least one nylon-6I/6T", and to the terms "component (C)" and "at least one polyaryl ether". These terms are likewise each used synonymously in the context of the present invention and therefore have the same meaning.

The sinter powder (SP) may comprise components (A), (B) and (C) in any desired amounts.

For example, the sinter powder comprises in the range from 20% to 90% by weight of component (A), in the range from 5% to 40% by weight of component (B) and in the range from 5% to 40% by weight of component (C), based in each case on the sum total of the percentages by weight of components (A), (B) and (C), preferably based on the total weight of the sinter powder (SP).

Preferably, the sinter powder (SP) comprises in the range from 45% to 80% by weight of component (A), in the range from 10% to 25% by weight of component (B) and in the range from 10% to 30% by weight of component (C), based in each case on the sum total of the percentages by weight of components (A), (B) and (C), preferably based on the total weight of the sinter powder (SP).

More preferably, the sinter powder comprises in the range from 53% to 73% by weight of component (A), in the range from 12% to 22% by weight of component (B) and in the range from 15% to 25% by weight of component (C), based in each case on the sum total of the percentages by weight of components (A), (B) and (C), preferably based on the total weight of the sinter powder (SP).

The present invention therefore also provides a process in which the sinter powder (SP) comprises in the range from 20% to 90% by weight of component (A), in the range from 5% to 40% by weight of component (B) and in the range from 5% to 40% by weight of component (C), based in each case on the sum total of the percentages by weight of components (A), (B) and (C).

The sinter powder (SP) may also additionally comprise at least one additive selected from the group consisting of antinucleating agents, stabilizers, end group functionalizers and dyes.

The present invention therefore also provides a process in which the sinter powder (SP) additionally comprises at least one additive selected from the group consisting of antinucleating agents, stabilizers, end group functionalizers and dyes.

An example of a suitable antinucleating agent is lithium chloride. Suitable stabilizers are, for example, phenols, phosphites and copper stabilizers. Suitable end group functionalizers are, for example, terephthalic acid, adipic acid and propionic acid. Preferred dyes are, for example, selected from the group consisting of carbon black, neutral red, inorganic black dyes and organic black dyes.

More preferably, the at least one additive is selected from the group consisting of stabilizers and dyes.

Phenols are especially preferred as stabilizer.

Therefore, the at least one additive is especially preferably selected from the group consisting of phenols, carbon black, inorganic black dyes and organic black dyes.

Carbon black is known to those skilled in the art and is available, for example, under the Spezialschwarz 4 trade name from Evonik, under the Printex U trade name from Evonik, under the Printex 140 trade name from Evonik, under the Spezialschwarz 350 trade name from Evonik or under the Spezialschwarz 100 trade name from Evonik.

A preferred inorganic black dye is available, for example, under the Sicopal Black K0090 trade name from BASF SE or under the Sicopal Black K0095 trade name from BASF SE.

An example of a preferred organic black dye is nigrosin.

The sinter powder (SP) may comprise, for example, in the range from 0.1% to 10% by weight of the at least one additive, preferably in the range from 0.2% to 5% by weight and especially preferably in the range from 0.3% to 2.5% by weight, based in each case on the total weight of the sinter powder (SP).

The sum total of the percentages by weight of components (A), (B) and (C) and optionally of the at least one additive typically add up to 100 percent by weight.

The sinter powder (SP) comprises particles. These particles have, for example, a size in the range from 10 to 250 μm, preferably in the range from 15 to 200 μm, more preferably in the range from 20 to 120 µm and especially preferably in the range from 20 to 110 µm.

The sinter powder (SP) of the invention has, for example,
a D10 in the range from 10 to 30 µm,
a D50 in the range from 25 to 70 µm and
a D90 in the range from 50 to 150 µm.
Preferably, the sinter powder (SP) of the invention has
a D10 in the range from 20 to 30 µm,
a D50 in the range from 40 to 60 µm and
a D90 in the range from 80 to 110 µm.

The present invention therefore also provides a process in which the sinter powder (SP) has
a D10 in the range from 10 to 30 µm,
a D50 in the range from 25 to 70 µm and
a D90 in the range from 50 to 150 µm.

In the context of the present invention, the "D10" is understood to mean the particle size at which 10% by volume of the particles based on the total volume of the particles are smaller than or equal to D10 and 90% by volume of the particles based on the total volume of the particles are larger than D10. By analogy, "D50" is understood to mean the particle size at which 50% by volume of the particles based on the total volume of the particles are smaller than or equal to D50 and 50% by volume of the particles based on the total volume of the particles are larger than D50. Correspondingly, the "D90" is understood to mean the particle size at which 90% by volume of the particles based on the total volume of the particles are smaller than or equal to D90 and 10% by volume of the particles based on the total volume of the particles are larger than D90.

To determine the particle sizes, the sinter powder (SP) is suspended in a dry state using compressed air or in a solvent, for example water or ethanol, and this suspension is analyzed. The D10, D50 and D90 values are determined by laser diffraction using a Malvern Master Sizer 3000. Evaluation is by means of Fraunhofer diffraction.

The sinter powder (SP) typically has a melting temperature ($T_M$) in the range from 180 to 270° C. Preferably, the melting temperature ($T_M$) of the sinter powder (SP) is in the range from 185 to 260° C. and especially preferably in the range from 190 to 245° C.

The present invention therefore also provides a process in which the sinter powder (SP) has a melting temperature ($T_M$) in the range from 180 to 270° C.

The melting temperature ($T_M$) is determined in the context of the present invention by means of differential scanning calorimetry (DSC). As described above, it is customary to measure a heating run (H) and a cooling run (C). This gives a DSC diagram as shown by way of example in FIG. 1. The melting temperature ($T_M$) is then understood to mean the temperature at which the melting peak of the heating run (H) of the DSC diagram has a maximum. The melting temperature ($T_M$) is thus different than the onset temperature of melting ($T_M^{onset}$). Typically, the melting temperature ($T_M$) is above the onset temperature of melting ($T_M^{onset}$).

The sinter powder (SP) typically also has a crystallization temperature ($T_C$) in the range from 120 to 190° C. Preferably, the crystallization temperature ($T_C$) of the sinter powder (SP) is in the range from 130 to 180° C. and especially preferably in the range from 140 to 180° C.

The present invention therefore also provides a process in which the sinter powder (SP) has a crystallization temperature ($T_C$) in the range from 120 to 190° C.

The crystallization temperature ($T_C$) is determined in the context of the present invention by means of differential scanning calorimetry (DSC). As described above, this customarily involves measuring a heating run (H) and a cooling run (C). This gives a DSC diagram as shown by way of example in FIG. 1. The crystallization temperature ($T_C$) is then the temperature at the minimum of the crystallization peak of the DSC curve. The crystallization temperature ($T_C$) is thus different than the onset temperature of crystallization ($T_C^{onset}$). The crystallization temperature ($T_C$) is typically below the onset temperature of crystallization ($T_C^{onset}$).

The sinter powder (SP) typically also has a glass transition temperature ($T_G$). The glass transition temperature ($T_G$) of the sinter powder (SP) is, for example, in the range from 20 to 150° C., preferably in the range from 50 to 100° C. and especially preferably in the range from 70 to 80° C.

The glass transition temperature ($T_G$) of the sinter powder (SP) is determined by means of differential scanning calorimetry. For determination, in accordance with the invention, first a first heating run (H1), then a cooling run (C) and subsequently a second heating run (H2) is measured on a sample of the sinter powder (SP) (starting weight about 8.5 g). The heating rate in the first heating run (H1) and in the second heating run (H2) is IQmin; the cooling rate in the cooling run (C) is likewise 20 K/min. In the region of the glass transition of the sinter powder (SP), a step is obtained in the second heating run (H2) in the DSC diagram. The glass transition temperature ($T_G$) of the sinter powder (SP) corresponds to the temperature at half the step height in the DSC diagram. This process for determination of the glass transition temperature is known to those skilled in the art.

The sinter powder (SP) typically also has a sintering window ($W_{SP}$). The sintering window ($W_{SP}$) is, as described above, the difference between the onset temperature of melting ($T_M^{onset}$) and the onset temperature of crystallization ($T_C^{onset}$). The onset temperature for the melting ($T_M^{onset}$) and the onset temperature for the crystallization ($T_C^{onset}$) are determined as described above.

The sintering window ($W_{SP}$) of the sinter powder (SP) is preferably in the range from 18 to 45 K (Kelvin), more preferably in the range from 21 to 40 K and especially preferably in the range from 21 to 35 K.

The present invention therefore also provides a process in which the sinter powder (SP) has a sintering window ($W_{SP}$), where the sintering window ($W_{SP}$) is the difference between the onset temperature of melting ($T_M^{onset}$) and the onset temperature of crystallization ($T_C^{onset}$) and where the sintering window ($W_{SP}$) is in the range from 18 to 45 K.

The sinter powder (SP) can be produced by any method known to those skilled in the art. Preferably, the sinter powder (SP) is produced by grinding components (A), (B) and (C) and optionally the at least one additive.

The production of the sinter powder (SP) by grinding can be conducted by any method known to those skilled in the art. For example, components (A), (B) and (C) and optionally the at least one additive are introduced into a mill and ground therein.

Suitable mills include all mills known to those skilled in the art, for example classifier mills, opposed jet mills, hammer mills, ball mills, vibratory mills or rotor mills.

The grinding in the mill can likewise be effected by any method known to those skilled in the art. For example, the grinding can take place under inert gas and/or while cooling with liquid nitrogen. Cooling with liquid nitrogen is preferred.

The grinding temperature is as desired. Grinding is preferably performed at temperatures of liquid nitrogen, for example at a temperature in the range from −210 to −195° C.

The present invention therefore also provides a process in which the sinter powder (SP) is produced by grinding components (A), (B) and (C) at a temperature in the range from −210 to −195° C., Component (A), component (B), component (C) and optionally the at least one additive can be introduced into the mill by any method known to those skilled in the art. For example, component (A), component (B) and component (C) and optionally the at least one additive can be introduced separately into the mill and ground therein and hence mixed with one another. It is also possible and preferable in accordance with the invention that component (A), component (B) and component (C) and optionally the at least one additive are compounded with one another and then introduced into the mill.

Processes for compounding are known as such to the person skilled in the art. For example, component (A), component (B) and component (C) and optionally the at least one additive can be compounded in an extruder, then extruded therefrom and introduced into the mill.

Component (A)

Component (A) is at least one semicrystalline polyamide.

According to the invention, "at least one semicrystalline polyamide" means either exactly one semicrystalline polyamide or a mixture of two or more semicrystalline polyamides.

"Semicrystalline" in the context of the present invention means that the polyamide has an enthalpy of fusion $\Delta H2_{(A)}$ of greater than 45 J/g, preferably of greater than 50 J/g and especially preferably of greater than 55 J/g, in each case measured by means of differential scanning calorimetry (DSC) according to ISO 11357-4:2014.

Component (A) of the invention also preferably has an enthalpy of fusion $\Delta H2_{(A)}$ of less than 200 J/g, more preferably of less than 150 J/g and especially preferably of less than 100 J/g, in each case measured by means of differential scanning calorimetry (DSC) according to ISO 11357-4:2014.

According to the invention, component (A) comprises at least one unit selected from the group consisting of —NH—$(CH_2)_m$—NH— units where m is 4, 5, 6, 7 or 8, —CO—$(CH_2)_n$—NH— units where n is 3, 4, 5, 6 or 7 and —CO—$(CH_2)_o$—CO— units where o is 2, 3, 4, 5 or 6.

Preferably, component (A) comprises at least one unit selected from the group consisting of —NH—$(CH_2)_m$—NH— units where m is 5, 6 or 7, —CO—$(CH_2)_n$—NH— units where n is 4, 5 or 6 and —CO—$(CH_2)_o$—CO— units where o is 3, 4 or 5.

Especially preferably, component (A) comprises at least one unit selected from the group consisting of —NH—$(CH_2)_6$—NH— units, —CO—$(CH_2)_5$—NH— units and —CO—$(CH_2)_4$—CO— units.

If component (A) comprises at least one unit selected from the group consisting of —CO—$(CH_2)_n$—NH— units, these units derive from lactams having 5 to 9 ring members, preferably from lactams having 6 to 8 ring members, especially preferably from lactams having 7 ring members.

Lactams are known to those skilled in the art. Lactams are generally understood in accordance with the invention to mean cyclic amides. According to the invention, these have 4 to 8 carbon atoms in the ring, preferably 5 to 7 carbon atoms and especially preferably 6 carbon atoms.

For example, the lactams are selected from the group consisting of butyro-4-lactam (γ-lactam, γ-butyrolactam), 2-piperidinone (δ-lactam; δ-valerolactam), hexano-6-lactam (ε-lactam; ε-caprolactam), heptano-7-lactam (ζ-lactam; ζ-heptanolactam) and octano-8-lactam (η-lactam; η-octanolactam).

Preferably, the lactams are selected from the group consisting of 2-piperidinone (δ-lactam; γ-valerolactam), hexano-6-lactam (ε-lactam; ε-caprolactam) and heptano-7-lactam (ζ-lactam; ζ-heptanolactam). Especially preferred is ε-caprolactam.

If component (A) comprises at least one unit selected from the group consisting of —NH—$(CH_2)_m$—NH— units, these units derive from diamines. In that case, component (A) is thus obtained by reaction of diamines, preferably by reaction of diamines with dicarboxylic acids.

Suitable diamines comprise 4 to 8 carbon atoms, preferably 5 to 7 carbon atoms and especially preferably 6 carbon atoms.

Diamines of this kind are selected, for example, from the group consisting of 1,4-diaminobutane (butane-1,4-diamine; tetramethylenediamine; putrescine), 1,5-diaminopentane (pentamethylenediamine; pentane-1,5-diamine; cadaverine), 1,6-diaminohexane (hexamethylenediamine; hexane-1,6-diamine), 1,7-diaminoheptane and 1,8-diaminooctane. Preference is given to the diamines selected from the group consisting of 1,5-diaminopentane, 1,6-diaminohexane and 1,7-diaminoheptane. 1,6-Diaminohexane is especially preferred.

If component (A) comprises at least one unit selected from the group consisting of —CO—$(CH_2)_o$—CO— units, these units are typically derived from dicarboxylic acids. In that case, component (A) was thus obtained by reaction of dicarboxylic acids, preferably by reaction of dicarboxylic acids with diamines.

In that case, the dicarboxylic acids comprise 4 to 8 carbon atoms, preferably 5 to 7 carbon atoms and especially preferably 6 carbon atoms.

These dicarboxylic acids are, for example, selected from the group consisting of butanedioic acid (succinic acid), pentanedioic acid (glutaric acid), hexanedioic acid (adipic acid), heptanedioic acid (pimelic acid) and octanedioic acid (suberic acid). Preferably, the dicarboxylic acids are selected from the group consisting of pentanedioic acid, hexanedioic acid and heptanedioic acid; hexanedioic acid is especially preferred Component (A) may additionally comprise further units. For example units which derive from lactams having 10 to 13 ring members, such as caprylolactam and/or laurolactam.

In addition, component (A) may comprise units derived from dicarboxylic acid alkanes (aliphatic dicarboxylic acids) having 9 to 36 carbon atoms, preferably 9 to 12 carbon atoms, and more preferably 9 to 10 carbon atoms. Aromatic dicarboxylic acids are also suitable.

Examples of dicarboxylic acids include azelaic acid, sebacic acid, dodecanedioic acid and also terephthalic acid and/or isophthalic acid.

It is also possible for component (A) to comprise units, for example, derived from m-xylylenediamine, di(4-aminophenyl)methane, di(4-aminocyclohexyl)methane, 2,2-di(4-aminophenyl)propane and 2,2-di(4-aminocyclohexyl)propane and/or 1,5-diamino-2-methylpentane.

The following nonexhaustive list comprises the preferred components (A) for use in the sinter powder (SP) of the invention and the monomers present.

AB Polymers:

| | |
|---|---|
| PA 4 | pyrrolidone |
| PA 6 | ε-caprolactam |
| PA 7 | enantholactam |
| PA 8 | caprylolactam |

AA/BB Polymers:

| | |
|---|---|
| PA 46 | tetramethylenediamine, adipic acid |
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 6T | hexamethylenediamine, terephthalic acid |
| PA MXD6 | m-xylylenediamine, adipic acid |
| PA 6/6I | (see PA 6), hexamethylenediamine, isophthalic acid |
| PA 6/6T | (see PA 6 and PA 6T) |
| PA 6/66 | (see PA 6 and PA 66) |
| PA 6/12 | (see PA 6), laurylolactam |
| PA 66/6/610 | (see PA 66, PA 6 and PA 610) |
| PA 6I/6T/PACM | as PA 6I/6T and diaminodicyclohexylmethane |
| PA 6/6I6T | (see PA 6 and PA 6T), hexamethylenediamine, isophthalic acid |

Preferably, component (A) is therefore selected from the group consisting of PA 6, PA 6.6, PA 6.10, PA 6.12, PA 6.36, PA 6/6.6, PA 6/6I6T, PA 6/6T and PA 6/6I.

Especially preferably, component (A) is selected from the group consisting of PA 6, PA 6.10, PA 6.6/6, PA 6/6T and PA 6.6. More preferably, component (A) is selected from the group consisting of PA 6 and PA 6/6.6. Most preferably, component (A) is PA 6.

The present invention therefore also provides a process in which component (A) is selected from the group consisting of PA 6, PA 6.6, PA 6.10, PA 6.12, PA 6.36, PA 6/6.6, PA 6/6I6T, PA 6/6T and PA 6/6I.

Component (A) generally has a viscosity number of 70 to 350 mL/g, preferably of 70 to 240 mL/g. According to the invention, the viscosity number is determined from a 0.5% by weight solution of component (A) and in 96% by weight sulfuric acid at 25° C. to ISO 307.

Component (A) preferably has a weight-average molecular weight ($M_W$) in the range from 500 to 2 000 000 g/mol, more preferably in the range from 5000 to 500 000 g/mol and especially preferably in the range from 10 000 to 100 000 g/mol. The weight-average molecular weight ($M_W$) is determined according to ASTM D4001.

Component (A) typically has a melting temperature ($T_M$). The melting temperature ($T_M$) of component (A) is, for example, in the range from 70 to 300° C. and preferably in the range from 220 to 295° C. The melting temperature ($T_M$) of component (A) is determined by means of differential scanning calorimetry as described above for the melting temperature ($T_M$) of the sinter powder (SP).

Component (A) also typically has a glass transition temperature ($T_G$). The glass transition temperature ($T_G$) of component (A) is, for example, in the range from 0 to 110° C. and preferably in the range from 40 to 105° C.

The glass transition temperature ($T_G$) of component (A) is determined by means of differential scanning calorimetry. For determination, in accordance with the invention, first a first heating run (H1), then a cooling run (C) and subsequently a second heating run (H2) is measured on a sample of component (A) (starting weight about 8.5 g), The heating rate in the first heating run (H1) and in the second heating run (H2) is 20 K/min; the cooling rate in the cooling run (C) is likewise 20 K/min. In the region of the glass transition of component (A), a step is obtained in the second heating run (H2) in the DSC diagram. The glass transition temperature ($T_G$) of component (A) corresponds to the temperature at half the step height in the DSC diagram. This process for determination of the glass transition temperature is known to those skilled in the art.

Component (B).

According to the invention, component B) is at least one nylon-6I/6T.

In the context of the present invention, "at least one nylon-6I/6T" means either exactly one nylon-6I/6T or a mixture of two or more nylons-6I/6T.

Nylon-6I/6T is a copolymer of nylon-6I and nylon-6T.

Preferably, component (B) consists of units derived from hexamethylenediamine, from terephthalic acid and from isophthalic acid.

In other words, component (B) is thus preferably a copolymer prepared proceeding from hexamethylenediamine, terephthalic acid and isophthalic acid.

Component (B) is preferably a random copolymer.

The at least one nylon-6I/6T used as component (B) may comprise any desired proportions of 6I units and of 6T units. Preferably, the molar ratio of 6I units to 6T units is in the range from 1:1 to 3:1, more preferably in the range from 1.5:1 to 2.5:1 and especially preferably in the range from 1.8:1 to 2.3:1.

Component (B) is an amorphous copolyamide.

"Amorphous" in the context of the present invention means that the pure component (B) does not have any melting point in differential scanning calorimetry (DSC) measured according to ISO 11357.

Component (B) has a glass transition temperature ($T_G$), The glass transition temperature ($T_G$) of component (B) is typically in the range from 100 to 150° C., preferably in the range from 115 to 135° C. and especially preferably in the range from 120 to 130° C. The glass transition temperature ($T_G$) of component (B) is determined by means of differential scanning calorimetry as described above for the determination of the glass transition temperature ($T_G$) of component (A).

The MVR (275° C./5 kg) (melt volume flow rate) is preferably in the range from 50 mL/10 min to 150 mL/10 min, more preferably in the range from 95 mL/10 min to 105 mL/0 min.

The zero shear rate viscosity no of component (B) is, for example, in the range from 770 to 3250 Pas. The zero shear rate viscosity $\eta_0$ is determined with a "DHR-1" rotary viscometer from TA Instruments and a plate-plate geometry with a diameter of 25 mm and a plate separation of 1 mm. Unequilibrated samples of component (B) are dried at 80° C. under reduced pressure for 7 days and these are then analyzed with a time-dependent frequency sweep (sequence test) with an angular frequency range of 500 to 0.5 rad/s. The following further analysis parameters are used: deformation: 1.0%, analysis temperature: 240° C., analysis time: 20 min, preheating time after sample preparation: 1.5 min.

Component (B) has an amino end group concentration (AEG) which is preferably in the range from 30 to 45 mmol/kg and especially preferably in the range from 35 to 42 mmol/kg.

For determination of the amino end group concentration (AEG), 1 g of component (B) is dissolved in 30 mL of a phenol/methanol mixture (volume ratio of phenol:methanol 75:25) and then subjected to potentiometric titration with 0.2 N hydrochloric acid in water.

Component (B) has a carboxyl end group concentration (CEG) which is preferably in the range from 60 to 155 mmol/kg and especially preferably in the range from 80 to 135 mmol/kg.

For determination of the carboxyl end group concentration (CEG), 1 g of component (B) is dissolved in 30 mL of benzyl alcohol. This is followed by visual titration at 120° C. with 0.05 N potassium hydroxide solution in water.

Component (C)

According to the invention, component (C) is at least one polyaryl ether.

In the context of the present invention, "at least one polyaryl ether" means either exactly one polyaryl ether or a mixture of two or more polyaryl ethers.

Polyaryl ethers are known to those skilled in the art as a polymer class.

Polyaryl ethers preferred in accordance with the invention comprise units of the general formula (I):

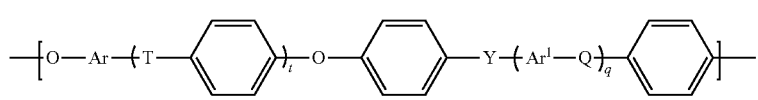

where the symbols t, q, Q, T, Y, Ar and $Ar^1$ are defined as follows:

t, q: each independently 0, 1, 2 or 3,

Q, T, Y: each independently a chemical bond or group selected from —O—, —S—, —SO$_2$—, S=O, C=O, —N=N— and —CR$^a$R$^b$— where R$^a$ and R$^b$ are each independently a hydrogen atom or a C$_1$-C$_{12}$-alkyl, C$_1$-C$_{12}$-alkoxy or C$_6$-C$_{18}$-aryl group, and where at least one of Q, T and Y is —SO$_2$— and Ar, $Ar^1$: each independently an arylene group having from 6 to 18 carbon atoms.

The present invention therefore also provides a process in which component (C) is a polyaryl ether comprising units of the general formula (I)

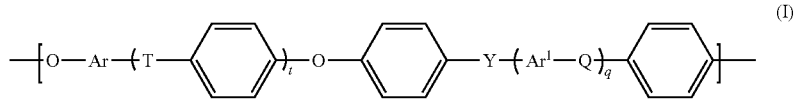

with the following definitions:

t, q: each independently 0, 1, 2 or 3,

Q, T, Y: each independently a chemical bond or group selected from —O—, —S—, —SO$_2$—, S=O, C=O, —N=N— and —CR$^a$R$^b$— where R$^a$ and R$^b$ are each independently a hydrogen atom or a C$_1$-C$_{12}$-alkyl, C$_1$-C$_{12}$-alkoxy or C$_6$-C$_{18}$-aryl group and where at least one of Q, T and Y is —SO$_2$— and Ar, $Ar^1$: each independently an arylene group having from 6 to 18 carbon atoms.

If Q, T or Y, under the abovementioned conditions, is a chemical bond, this is understood to mean that the adjacent group to the left and the adjacent group to the right are joined directly to one another via a chemical bond.

Preferably, however, Q, T and Y in formula (I) are independently selected from —O— and —SO$_2$—, with the proviso that at least one of the group consisting of Q, T and Y is —SO$_2$—. These polyaryl ethers are polyaryl ether sulfones.

The present invention thus also provides a method in which component (C) is a polyaryl ether sulfone.

If Q, T or Y is —CR$^a$R$^b$—, R$^a$ and R$^b$ are each independently a hydrogen atom or a C$_1$-C$_{12}$-alkyl, C$_1$-C$_{12}$-alkoxy or C$_6$-C$_{18}$-aryl group.

Preferred C$_1$-C$_{12}$-alkyl groups comprise linear and branched, saturated alkyl groups having from 1 to 12 carbon atoms. Particular mention should be made of the following radicals: C$_1$-C$_6$-alkyl radical such as methyl, ethyl, n-propyl, i-propyl, n-butyl, sec-butyl, 2- or 3-methylpentyl and longer-chain radicals such as unbranched heptyl, octyl, nonyl, decyl, undecyl, lauryl and the singly or multiply branched analogs thereof.

Useful alkyl radicals in the aforementioned usable C$_1$-C$_{12}$-alkoxy groups include the alkyl groups defined further up having from 1 to 12 carbon atoms. Cycloalkyl radicals usable with preference include especially C$_3$-C$_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and $Ar^1$ are independently a C$_6$-C$_{18}$-arylene group. Ar is preferably derived from an electron-rich aromatic substance subject to easy electrophilic attack, preferably selected from the group consisting of hydroquinone, resorcinol, dihydroxynaphthalene, especially 2,7-dihydroxynaphthalene, and 4,4'-bisphenol. $Ar^1$ is preferably an unsubstituted C$_6$- or C$_{12}$-arylene group.

Useful C$_6$-C$_{18}$-arylene groups Ar and $Ar^1$ include in particular phenylene groups such as 1,2-, 1,3- and 1,4-phenylene, naphthylene groups, for example 1,6-, 1,7-, 2,6- and 2,7-naphthylene, and the arylene groups derived from anthracene, phenanthrene and naphthacene.

Preferably, Ar and $Ar^1$ in the preferred embodiment of formula (I) are each independently selected from the group consisting of 1,4-phenylene, 1,3-phenylene, naphthylene, especially 2,7-dihydroxynaphthylene, and 4,4'-bisphenylene.

Preferred polyaryl ethers are those comprising at least one of the following units Ia to Io as repeat structural units:

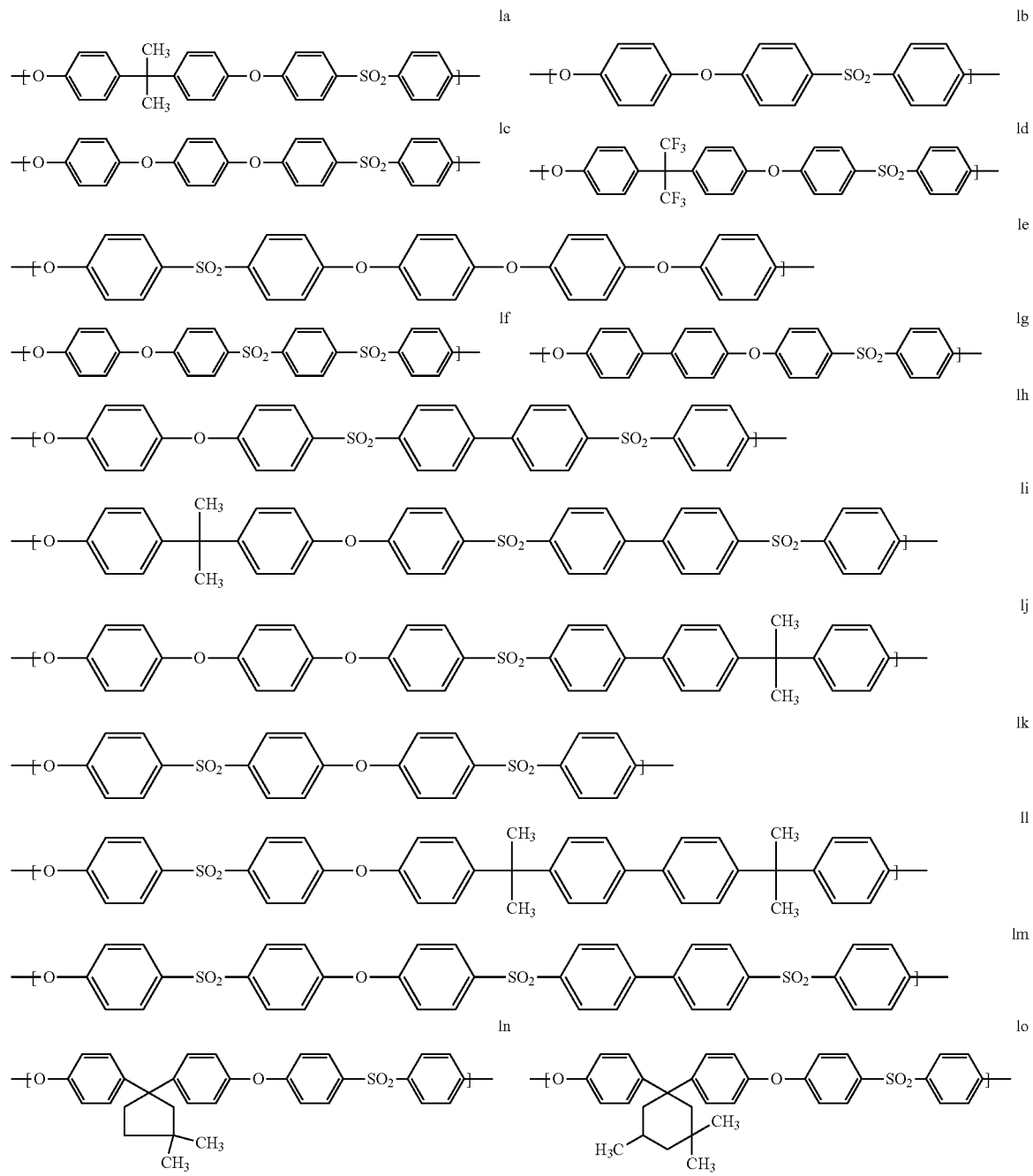

In addition to the preferred units Ia to Io, preference is also given to those units in which one or more 1,4-phenylene units which originate from hydroquinone are replaced by 1,3-phenylene units which originate from resorcinol or by naphthylene units which originate from dihydroxynaphthalene.

Particularly preferred units of the general formula (I) are the units Ia, Ig and Ik. It is also particularly preferred when component (C) is formed essentially from one kind of units of the general formula (I), especially from a unit selected from Ia, Ig and Ik.

In a particularly preferred embodiment, Ar=1,4-phenylene, t=1, q=0, T is a chemical bond and Y=SO$_2$. Particularly preferred polyaryl ether sulfones formed from the aforementioned repeat unit are referred to as polyphenylene sulfone (PPSU) (formula Ig).

In a further particularly preferred embodiment, Ar=1,4-phenylene, t=1, q=0, T=C(CH$_3$)$_2$ and Y=SO$_2$. Particularly preferred polyaryl ether sulfones formed from the aforementioned repeat unit are referred to as polysulfone (PSU) (formula Ia).

In a further particularly preferred embodiment, Ar=1,4-phenylene, t=1, q=0, T=Y=SO$_2$. Particularly preferred polyaryl ether sulfones formed from the aforementioned repeat unit are referred to as polyether sulfone (PESU) (formula Ik).

Preferably, component (C) is therefore selected from the group consisting of PSU, PESU and PPSU.

The present invention therefore also provides a process in which component (C) is selected from the group consisting of PSU, PESU and PPSU.

Abbreviations such as PPSU, PSU and PESU in the context of the present invention conform to DIN EN ISO 1043-1 (Plastics—Symbols and abbreviated terms—Part 1: Basic polymers and their special characteristics (ISO 1043-1:2001); German version EN ISO 1043-1:2002).

Component (C) preferably has a weight-average molecular weight $M_w$ of 10 000 to 150 000 g/mol, especially of 15 000 to 120 000 g/mol, more preferably of 18 000 to 100 000 g/mol, determined by means of gel permeation chromatography in a dimethylacetamide solvent versus narrow-distribution polymethylmethacrylate as standard.

Component (C) preferably has a number-average molecular weight $M_n$ of 10 000 to 35 000 g/mol, determined by means of gel permeation chromatography in a dimethylacetamide solvent against narrow-distribution polymethylmethacrylate as standard.

The polydispersity is preferably from 1.9 to 7.5, more preferably from 2.1 to 4.

In addition, component (C) in neat form preferably has an apparent melt viscosity at 350° C./1150 s$^{-1}$ of 100 to 1000 Pa s, preferably of 150 to 300 Pa s and especially preferably of 150 to 275 Pa s.

The melt viscosity is determined by means of a capillary rheometer. The apparent viscosity is determined at 350° C. as a function of the shear rate in a capillary viscometer (Göttfert Rheograph 2003 capillary viscometer) with a circular capillary of length 30 mm, a radius of 0.5 mm, a nozzle inlet angle of 180°, a diameter of the reservoir vessel for the melt of 12 mm and with a preheating time of 5 minutes. The values reported are those determined at 1150 s$^{-1}$.

The glass transition temperature $T_G$ of the polyaryl ether is typically in the range from 160 to 270° C., preferably in the range from 170 to 250° C. and especially preferably in the range from 180 to 230° C., determined by differential scanning calorimetry as described above (DSC).

The glass transition temperature $T_G$ is understood to mean the temperature at which component (C) solidifies in the course of cooling to give a glassy solid.

The polyaryl ethers of the invention are typically amorphous. "Amorphous" in the context of the present invention means that the polyaryl ethers do not have a melting temperature $T_M$. They have only a glass transition temperature $T_G$. At the glass transition temperature $T_G$, the polyaryl ether changes from the solid state to the molten state.

The present invention therefore also provides a process in which component (C) is amorphous.

Shaped Body

According to the invention, the process of selective laser sintering described further up affords a shaped body. The sinter powder (SP) melted by the laser in the selective exposure resolidifies after the exposure and thus forms the shaped body of the invention. The shaped body can be removed from the powder bed directly after the solidification of the molten sinter powder (SP). It is likewise possible first to cool the shaped body and only then to remove it from the powder bed. Any adhering particles of the sinter powder (SP) which has not yet melted can be mechanically removed from the surface by known methods. The method for surface treatment of the shaped body includes, for example, vibratory grinding or barrel polishing, and also sandblasting, glass bead blasting or microbead blasting.

It is also possible to subject the shaped bodies obtained to further processing or, for example, to treat the surfaces.

The shaped body of the invention comprises, for example, in the range from 20% to 90% by weight of component (A), in the range from 5% to 40% by weight of component (B) and in the range from 5% to 40% by weight of component (C), based in each case on the total weight of the shaped body.

The shaped body preferably comprises in the range from 45% to 80% by weight of component (A), in the range from 10% to 25% by weight of component (B) and in the range from 10% to 30% by weight of component (C), based in each case on the total weight of the shaped body.

The shaped body more preferably comprises in the range from 53% to 73% by weight of component (A), in the range from 12% to 22% by weight of component (B) and in the range from 15% to 25% by weight of component (C), based in each case on the total weight of the shaped body.

According to the invention, component (A) is the component (A) that was present in the sinter powder (SP). Component (B) is likewise the component (B) that was present in the sinter powder (SP), and component (C) is likewise the component (C) that was present in the sinter powder (SP).

If the sinter powder (SP) comprises the at least one additive, the shaped body obtained in accordance with the invention also comprises the at least one additive.

It will be clear to the person skilled in the art that, as a result of the exposure of the sinter powder (SP) to the laser, component (A), component (B), component (C) and optionally the at least one additive can enter into chemical reactions and be altered as a result. Reactions of this kind are known to those skilled in the art.

Preferably, component (A), component (B), component (C) and optionally the at least one additive do not enter into any chemical reaction as a result of the exposure of the sinter powder (SP) to the laser; instead, the sinter powder (SP) merely melts.

The present invention therefore also provides a shaped body obtainable by the process of the invention.

The use of at least one polyaryl ether in the sinter powder (SP) of the invention broadens the sintering window ($W_{SP}$) of the sinter powder (SP) compared to the sintering window ($W_{AB}$) of a mixture of components (A) and (B).

The present invention therefore also provides for the use of at least one polyaryl ether in a sinter powder (SP) comprising the following components:
 (A) at least one semicrystalline polyamide comprising at least one unit selected from the group consisting of —NH—(CH$_2$)$_m$—NH— units where m is 4, 5, 6, 7 or 8, —CO—(CH$_2$)$_n$—NH— units where n is 3, 4, 5, 6 or 7, and —CO—(CH$_2$)$_o$—CO— units where o is 2, 3, 4, 5 or 6,
 (B) at least one nylon-6I/6T,
 (C) at least one polyaryl ether,
for broadening the sintering window ($W_{SP}$) of the sinter powder (SP) compared to the sintering window ($W_{AB}$) of a mixture of components (A) and (B), where the sintering window ($W_{SP}$; $W_{AB}$) in each case is the difference between the onset temperature of melting ($T_M^{onset}$) and the onset temperature of crystallization ($T_C^{onset}$).

For example, the sintering window ($W_{AB}$) of a mixture of components (A) and (B) is in the range from 15 to 40 K (Kelvin), more preferably in the range from 20 to 35 K and especially preferably in the range from 20 to 33 K.

The sintering window ($W_{SP}$) of the sinter powder (SP) broadens with respect to the sintering window ($W_{AB}$) of the mixture of components (A) and (B), for example, by 1 to 8 K, preferably by 1 to 5 K and especially preferably by 1 to 3 K.

It will be apparent that the sintering window ($W_{SP}$) of the sinter powder (SP) is broader than the sintering window ($W_{AB}$) of the mixture of components (A) and (B) present in the sinter powder (SP).

The invention is elucidated in detail hereinafter by examples, without restricting it thereto.

EXAMPLES

The following components are used:
Semicrystalline polyamide (component (A)):

| | |
|---|---|
| (P1) | nylon-6 (Ultramid® B27, BASF SE) |

Amorphous polyamide (component (B)):

| | |
|---|---|
| (AP1) | nylon-6I/6T (Grivory G16, EMS), with a molar ratio 6I:6T of 1.9:1 |

Amorphous polymer (component (C)):

| | |
|---|---|
| (HP1) | polysulfone (Ultrason S2010, BASF SE) |
| (HP2) | styrene-N-phenylmaleimide-maleic anhydride copolymer (Denka IP MS-NB, Denka) |

Additive:

| | |
|---|---|
| (A1) | Irganox 1098 (N,N'-hexane-1,6-diylbis(3-(3,5-di-tert-butyl-4-hydroxyphenylpropionamide)), BASF SE) |
| (A2) | polyhydroxy ether-thermoplastic-thermoset resin (Phenoxy Resin, InChem) |

Table 1 states the essential parameters of the semicrystalline polyamides used (component (A)), table 2 states essential parameters of the amorphous polyamides used (component (B)), and tables 3 states essential parameters of the amorphous polymers used (component (C)).

TABLE 1

| | Type | AEG [mmol/kg] | CEG [mmol/kg] | $T_M$ [° C.] | $T_G$ [° C.] | Zero shear rate viscosity $\eta_0$ at 240° C. [Pas] |
|---|---|---|---|---|---|---|
| P1 | PA 6 | 36 | 54 | 220.0 | 53 | 399 |

TABLE 2

| | Type | AEG [mmol/kg] | CEG [mmol/kg] | $T_G$ [° C.] | Zero shear rate viscosity $\eta_0$ at 240° C. [Pas] |
|---|---|---|---|---|---|
| AP1 | PA 6I/6T | 37 | 86 | 125 | 770 |

TABLE 3

| | Type | $T_G$ [° C.] | Density $\rho$ [g/cm$^3$] | Viscosity number VN [ml/g] | Melt volume flow rate MVR [g/10 min] |
|---|---|---|---|---|---|
| HP1 | Polysulfone | 185 | 1.234 | 63 | 90 (360° C., 10 kg) |
| HP2 | Styrene-N-phenylmaleimide-maleic anhydride copolymer | 196 | 1.18 | | 3 (265° C., 10 kg) |

AEG indicates the amino end group concentration. This is determined by means of titration. For determination of the amino end group concentration (AEG), 1 g of the component (semicrystalline polyamide or amorphous polyamide) was dissolved in 30 mL of a phenol/methanol mixture (volume ratio of phenol:methanol 75:25) and then subjected to potentiometric titration with 0.2 N hydrochloric acid in water.

The CEG indicates the carboxyl end group concentration. This is determined by means of titration. For determination of the carboxyl end group concentration (CEG), 1 g of the component (semicrystalline polyamide or amorphous polyamide) was dissolved in 30 mL of benzyl alcohol. This was followed by visual titration at 120° C. with 0.05 N potassium hydroxide solution in water.

The melting temperature ($T_M$) of the semicrystalline polyamides and all glass transition temperatures ($T_G$) were each determined by means of differential scanning calorimetry.

For determination of the melting temperature ($T_M$), as described above, a first heating run (H1) at a heating rate of 20 K/min was measured. The melting temperature ($T_M$) then corresponded to the temperature at the maximum of the melting peak of the heating run (H1).

For determination of the glass transition temperature ($T_G$), after the first heating run (H1), a cooling run (C) and subsequently a second heating run (H2) were measured.

The cooling run was measured at a cooling rate of 20 K/min; the first heating run (H1) and the second heating run (H2) were measured at a heating rate of 20 K/min. The glass transition temperature ($T_G$) was then determined as described above at half the step height of the second heating run (H2).

The zero shear rate viscosity no was determined with a "DHR-1" rotary viscometer from TA Instruments and a plate-plate geometry with a diameter of 25 mm and a plate separation of 1 mm. Unequilibrated samples were dried at 80° C. under reduced pressure for 7 days and these were then analyzed with a time-dependent frequency sweep (sequence test) with an angular frequency range of 500 to 0.5 rad/s. The following further analysis parameters were used: deformation: 1.0%, analysis temperature: 240° C., analysis time: 20 min, preheating time after sample preparation: 1.5 min.

Density was determined to DIN EN ISO 1183-1:2013.

The melt volume flow rate (MVR) was determined to DIN EN ISO 1133-1:2011.

Viscosity number was determined to ISO 307, 1157, 1628.

Blends Comprising a Single Amorphous Polymer

For production of blends, the components specified in table 4 were compounded in the ratios specified in table 4 in a DSM 15 cm$^3$ miniextruder (DSM-Micro15 microcompounder) at a speed of 80 rpm (revolutions per minute) at 260° C. for a mixing time of 3 min (minutes) and then extruded. The extrudates obtained were then ground in a mill and sieved to a particle size of <200 μm.

The blends obtained were characterized. The results can be seen in table 5.

TABLE 4

| Example | (P1) [% by wt.] | (AP1) [% by wt.] | (HP1) [% by wt.] | (A1) [% by wt.] | (A2) [% by wt.] | (A3) [% by wt.] |
|---|---|---|---|---|---|---|
| C1 | 100 | | | | | |
| C2 | 79 | 21 | | | | |
| C3 | 78.6 | 21 | | 0.4 | | |
| I4 | 79.6 | | 18 | 0.4 | 2 | |

TABLE 5

| Example | Magnitude of complex viscosity at 0.5 rad/s, 240° C. [Pas] | Ratio of viscosity after aging to before aging | $T_M$ [° C.] | $T_C$ [° C.] | Sintering window W [C] | Sintering window W after aging [C] |
|---|---|---|---|---|---|---|
| C1 | 370 | 0.11 | 219.7 | 187.8 | 16.7 | 11.2 |
| C2 | 483 | 0.39 | 219.5 | 173.2 | 24.5 | 23.9 |
| C3 | 569 | 5.75 | 217.7 | 175.8 | 25.8 | 27.9 |
| I4 | 740 | 1.18 | 219.1 | 187.3 | 18.1 | 15.3 |

The melting temperature ($T_M$) was determined as described above.

The crystallization temperature ($T_C$) was determined by means of differential scanning calorimetry. For this purpose, first a heating run (H) at a heating rate of 20 K/min and then a cooling run (C) at a cooling rate of 20 K/min were measured. The crystallization temperature ($T_C$) is the temperature at the extreme of the crystallization peak.

To determine the thermooxidative stability of the blends, the complex shear viscosity of freshly produced blends and of blends after oven aging at 0.5% oxygen and 195° C. for 16 hours was determined. The ratio of viscosity after storage (after aging) to the viscosity before storage (before aging) was determined. The viscosity is measured by means of rotary rheology at a measurement frequency of 0.5 rad/s at a temperature of 240° C.

It can be seen from the examples in table 5 that the use of inventive components (A), (B) and (C) in the blend achieves improved thermal stability over the pure component (A). In addition, a broadened sintering window is achieved, especially after thermal storage.

Sinter Powder for Selective Laser Sintering

For production of sinter powders, the components specified in table 6 were compounded in the ratio specified in table 6 in a twin-screw extruder (MC26) at a speed of 300 rpm (revolutions per minute) and a throughput of 10 kg/h at a temperature of 270° C. with subsequent extrudate pelletization. The pelletized material thus obtained was ground to a particle size of 20 to 100 μm.

The sinter powders obtained were characterized as described above. The results can be seen in table 7.

TABLE 6

| Example | (P1) [% by wt.] | (AP1) [% by wt.] | (HP1) [% by wt.] | (HP2) [% by wt.] | (A1) [% by wt.] | (A2) [% by wt.] |
|---|---|---|---|---|---|---|
| C5 | 100 | | | | | |
| C6 | 79 | 21 | | | | |
| C7 | 78.5 | 21 | | | 0.5 | |
| I8 | 58.5 | 21 | 18 | | 0.5 | 2 |
| C9 | 58.5 | 21 | | 20 | 0.5 | |
| I10 | 60.5 | 21 | 18 | | 0.5 | |

TABLE 7

| Example | Magnitude of complex viscosity at 0.5 rad/s, 240° C. [Pas] | Ratio of viscosity after aging to before aging | $T_M$ [° C.] | $T_C$ [° C.] | $T_G$ [° C.] | Sintering window W [C] | Sintering window W after aging [C] | Broadening of sintering window ΔW compared to (C8) [C] | Broadening of sintering window ΔW compared to (C8) after aging [C] |
|---|---|---|---|---|---|---|---|---|---|
| C5 | 370 | 0.11 | 219.7 | 187.8 | 53 | 16.7 | 11.2 | — | — |
| C6 | 637 | 0.25 | 217.9 | 173.4 | 66 | 24.1 | 23.9 | — | — |
| C7 | 692 | 2.92 | 217.8 | 170.2 | 66 | 28.2 | 26.8 | — | — |
| I8 | 1362 | 1.47 | 215.0 | 167 | 73 | 28.8 | 31.4 | 0.6 | 4.6 |
| C9 | 1551 | 1.21 | 215.7 | 166.7 | 70 | 29.4 | 31.5 | 1.2 | 4.7 |
| I10 | 1302 | 1.08 | 216.4 | 168.0 | 71 | 27.7 | 28.9 | −0.5 | 2.1 |

The magnitude of the complex shear viscosity was determined by means of a plate-plate rotary rheometer at an angular frequency of 0.5 rad/s and a temperature of 240° C. A "DHR-1" rotary viscometer from TA Instruments was used, with a diameter of 25 mm and a plate separation of 1 mm. Unequilibrated samples were dried at 80° C. under reduced pressure for 7 days and these are then analyzed with a time-dependent frequency sweep (sequence test) with an angular frequency range of 500 to 0.5 rad/s.

The following further analysis parameters were used: deformation: 1.0%, analysis time: 20 min, preheating time after sample preparation: 1.5 min.

The sintering window (W) was determined, as described above, as the difference between the onset temperature of melting ($T_M^{onset}$) and the onset temperature of crystallization ($T_C^{onset}$).

The sinter powders from inventive examples I8 and I10 and from comparative example C9 exhibit a distinctly broadened sintering window after aging. There is likewise a distinct improvement in the aging stability, characterized by the viscosity ratio after aging to before aging, over comparative examples C5, C6 and C7. As shown further down, the elongation at break properties of shaped bodies produced from the sinter powder according to comparative example C9, however, are much poorer than those of the shaped bodies produced from the inventive sinter powders according to examples I8 and I10.

Laser Sintering Experiments

The sinter powder was introduced with a layer thickness of 0.12 mm into the cavity at the temperature specified in table 8. The sinter powder was subsequently exposed to a laser with the laser power output specified in table 8 and the point spacing specified, with a speed of the laser over the sample during exposure of 5 m/s. The point spacing is also known as laser spacing or lane spacing. Selective laser sintering typically involves scanning in stripes. The point spacing gives the distance between the centers of the stripes, i.e. between the two centers of the laser beam for two stripes.

TABLE 8

| Example | Temperature [° C.] | Laser power output [W] | Laser speed [m/s] | Point spacing [mm] |
| --- | --- | --- | --- | --- |
| C5 | 209 | 18 | 5 | 0.2 |
| C6 | 195 | 20 | 5 | 0.2 |
| C7 | 200 | 25 | 5 | 0.2 |
| I8 | 195 | 25 | 5 | 0.2 |
| C9 | 195 | 25 | 5 | 0.2 |
| I10 | 198 | 25 | 5 | 0.2 |

Subsequently, the properties of the tensile bars (sinter bars) obtained were determined. The tensile bars (sinter bars) obtained were tested in the dry state after drying at 80° C. for 336 h under reduced pressure. The results are shown in table 9. In addition, Charpy bars were produced, which were likewise tested in dry form (according to ISO179-2/1 eU: 1997+Amd.1:2011).

The warpage of the sinter bars obtained was determined by placing the sinter bar with the concave side down onto a planar surface. The distance ($a_m$) between the planar surface and the upper edge of the middle of the sinter bar was then determined. In addition, the thickness ($d_m$) in the middle of the sinter bar was determined. Warpage in % is then determined by the following formula:

$$V = 100 \cdot (a_m - d_m)/d_m$$

The dimensions of the sinter bars were typically length 80 mm, width 10 mm and thickness 4 mm.

The flexural strength corresponds to the maximum stress in the bending test. The bending test is a three-point bending test according to EN ISO 178:2010+A1:2013.

Processability was assessed quantitatively with "2" meaning "good", i.e. low warpage of the component, and "5" meaning "inadequate", i.e. severe warpage of the component.

Tensile strength, tensile modulus of elasticity and elongation at break were determined according to ISO 527-1: 2012.

The water absorption of the tensile bars (sinter bars) obtained was determined by weighing the tensile bars in the dried state (after storage at 80° C. under reduced pressure for 336 hours) and in the conditioned state (after storage at 70° C. and 62% relative humidity for 336 hours).

TABLE 9

| Example | Warpage of flexural bar from SLS [%] | Processability in SLS | Flexural strength [MPa] | Tensile strength [MPa] | Tensile modulus of elasticity [MPa] | Elongation at break [%] | Charpy impact resistance $a_{CU}$ [kJ/m$^2$] | Charpy notch impact strength [kJ/m$^2$] | Water absorption [% by wt.] |
| --- | --- | --- | --- | --- | --- | --- | --- | --- | --- |
| C5 | 45-55 | 4 | | | | | | | |
| C6 | not determined | 2 | | | | | | | |
| C7 | 52 ± 14 | 2 | 100 | 64 | 3600 | 1.9 | 5.0 | 1.5 | 2.7 |
| I8 | 32 ± 7 | 1 | 95 | 76 | 3300 | 2.8 | 7.6 | 1.65 | 1.9 |
| C9 | 30 ± 3 | 1 | 43 | 28.5 | 3100 | 0.9 | — | | |
| I10 | 0.4 ± 1.2 | 1 | — | 68.9 | 3500 | 2.5 | 8.1 | | |

It is apparent that a shaped body produced with the sinter powder according to comparative example C9 does have low warpage, but also exhibits only very low elongation at break.

The shaped bodies produced from the inventive sinter powders according to examples I8 and I10 have reduced warpage together with elevated elongation at break and impact resistance.

It is apparent that shaped bodies produced with the sinter powder (SP) of the invention give a lower water absorption of only 1.9% by weight. The theoretical expectation was 2.16% by weight, the theoretical calculation being based on the assumption that, when the sinter powder (SP) comprises 20% by weight of polyamides of various components that do not absorb water, the sinter powder exhibits 80% of the water absorption of a sinter powder comprising exclusively polyamide (C7).

The invention claimed is:

1. A process for producing a shaped body by selective laser sintering of a sinter powder (SP), wherein the sinter powder (SP) comprises the following components:
   (A) at least one semicrystalline polyamide comprising at least one unit selected from the group consisting of —NH—$(CH_2)_m$—NH— units where m is 4, 5, 6, 7 or 8, —CO—$(CH_2)_n$—NH— units where n is 3, 4, 5, 6 or 7, and —CO—$(CH_2)_o$—CO— units where o is 2, 3, 4, 5 or 6,
   (B) at least one nylon-6I/6T,
   (C) at least one polyaryl ether,
   wherein
   component (C) is a polyaryl ether containing units of the general formula (I)

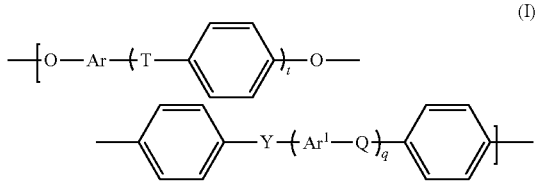

with the following definitions:
t, q: each independently 0, 1, 2 or 3,
Q, T, Y: each independently a chemical bond or group selected from —O—, —S—, —$SO_2$—, S=O, C=O, —N=N— and —$CR^aR^b$— where $R^a$ and $R^b$ are each independently a hydrogen atom or a $C_1$-$C_{12}$-alkyl, $C_1$-$C_{12}$-alkoxy or $C_6$-$C_{18}$-aryl group and where at least one of Q, T and Y is-$SO_2$— and
Ar, $Ar^1$: each independently an arylene group having from 6 to 18 carbon atoms, and wherein a first layer of the sinter powder (SP) is arranged in a powder bed and locally exposed to a laser beam, and wherein the sinter powder (SP) comprises in the range from 20% to 90% by weight of component (A), in the range from 5% to 40% by weight of component (B) and in the range from 5% to 40% by weight of component (C), based in each case on the sum total of the percentages by weight of components (A), (B) and (C).

2. The process according to claim 1, wherein the sinter powder (SP) has
   a D10 in the range from 10 to 30 μm,
   a D50 in the range from 25 to 70 μm and
   a D90 in the range from 50 to 150 μm,
   wherein the particle sizes of the sinter powder (SP) are determined by a laser diffraction.

3. The process according to claim 1, wherein the sinter powder (SP) has a melting temperature ($T_M$) in the range from 180 to 270° C., wherein the melting temperature ($T_M$) is determined by means of dynamic differential calorimetry.

4. The process according to claim 1, wherein the sinter powder (SP) has a crystallization temperature ($T_C$) in the range from 120 to 190° C., wherein the crystallization temperature ($T_C$) is determined by means of dynamic differential calorimetry.

5. The process according to claim 1, wherein the sinter powder (SP) has a sintering window ($W_{SP}$), where the sintering window ($W_{SP}$) is the difference between the onset temperature of melting ($T_M^{onset}$) and the onset temperature of crystallization ($T_C^{onset}$) and where the sintering window ($W_{SP}$) is in the range from 18 to 45 K.

6. The process according to claim 1, wherein the sinter powder (SP) is produced by grinding components (A), (B) and (C) at a temperature in the range from −210 to −195° C.

7. The process according to claim 1, wherein component (A) is selected from the group consisting of PA 6, PA 6.6, PA 6.10, PA 6.12, PA 6.36, PA 6/6.6, PA 6/6I6T, PA 6/6I and PA 6/6T.

8. The process according to claim 1, wherein component (C) is selected from the group consisting of PSU, PESU and PPSU.

9. The process according to claim 1, wherein the sinter powder (SP) additionally comprises at least one additive selected from the group consisting of antinucleating agents, stabilizers, end group functionalizers and dyes.

10. A process for broadening the sintering window ($W_{SP}$) of a sinter powder (SP) compared to the sintering window ($W_{AB}$) of a mixture of components (A) and (B) which comprises incorporating into the sinter powder at least one polyaryl ether in the sinter powder (SP) comprising the following components:
   (A) at least one semicrystalline polyamide comprising at least one unit selected from the group consisting of —NH—$(CH_2)_m$—NH— units where m is 4, 5, 6, 7 or 8, —CO—$(CH_2)_n$—NH— units where n is 3, 4, 5, 6 or 7, and —CO—$(CH_2)_o$—CO— units where o is 2, 3, 4, 5 or 6,
   (B) at least one nylon-6I/6T,
   (C) at least one polyaryl ether,
   where the sintering window ($W_{SP}$; $W_{AB}$) in each case is the difference between the onset temperature of melting ($T_M^{onset}$) and the onset temperature of crystallization ($T_C^{onset}$), wherein
   the polyaryl ether contains units of the general formula (I)

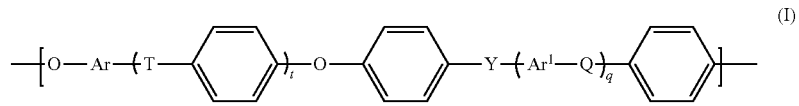

with the following definitions:

t, q: each independently 0, 1, 2 or 3,

Q, T, Y: each independently a chemical bond or group selected from —O—, —S—, —SO$_2$—, S=O, C=O, —N=N— and —CR$^a$R$^b$— where R$^a$ and R$^b$ are each independently a hydrogen atom or a C$_1$-C$_{12}$-alkyl, C$_1$-C$_{12}$-alkoxy or C$_6$-C$_{18}$-aryl group and where at least one of Q, T and Y is-SO$_2$— and Ar, Ar$^1$: each independently an arylene group having from 6 to 18 carbon atoms, wherein the sinter powder (SP) comprises in the range from 20% to 90% by weight of component (A), in the range from 5% to 40% by weight of component (B) and in the range from 5% to 40% by weight of component (C), based in each case on the sum total of the percentages by weight of components (A), (B) and (C).

* * * * *